United States Patent
Dallmann et al.

(10) Patent No.: US 7,181,586 B2
(45) Date of Patent: Feb. 20, 2007

(54) FORMATTING A DATA STORAGE MEDIUM TO A DESIRED BLOCK FORMAT

(75) Inventors: David Christopher Dallmann, Meridian, ID (US); Andrew Hills Dallmann, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 10/816,897

(22) Filed: Apr. 5, 2004

(65) Prior Publication Data
US 2005/0223169 A1    Oct. 6, 2005

(51) Int. Cl.
*G06F 12/00* (2006.01)
(52) U.S. Cl. .................. 711/170; 711/154; 711/156; 711/158; 711/114
(58) Field of Classification Search .......... 711/170, 711/154, 156, 158, 114
See application file for complete search history.

(56) References Cited

U.S. PATENT DOCUMENTS

| | | | | |
|---|---|---|---|---|
| 5,706,472 A * | 1/1998 | Ruff et al. | .................. | 711/173 |
| 6,088,778 A * | 7/2000 | Ruff et al. | .................. | 711/173 |
| 6,154,792 A * | 11/2000 | Giordano et al. | ............. | 710/20 |
| 6,178,487 B1 * | 1/2001 | Ruff et al. | .................. | 711/165 |
| 6,681,291 B2 * | 1/2004 | Ikeuchi et al. | ............. | 711/114 |
| 6,681,308 B1 | 1/2004 | Dallmann | | |
| 6,851,022 B2 * | 2/2005 | Ikeuchi et al. | ............. | 711/114 |
| 2003/0018851 A1 * | 1/2003 | Ikeuchi et al. | ............. | 711/114 |
| 2003/0018864 A1 * | 1/2003 | Ikeuchi et al. | ............. | 711/161 |

* cited by examiner

*Primary Examiner*—Stephen C. Elmore

(57) ABSTRACT

A method, system and program product of block formatting a data storage medium in or to be added to an array of data storage media to a desired block format, the method comprising in one embodiment, writing initially only to any region of the data storage media that will be read during initialization of the array of data storage media; and setting a write size for writing steps to be performed after initialization to be greater than or equal to a read size.

18 Claims, 4 Drawing Sheets

---

100 — Determining if a fast format indicator has been set for the data storage medium 110 — If the fast format indicator is set, then writing initially to any region of the data storage medium that will be read during initialization of the array of data storage medium, wherein a set of blocks to be written during the writing step is greater than or equal to a maximum read size

FIG. 1

100 — Determining if a fast format indicator has been set for the data storage medium 110 — If the fast format indicator is set, then writing initially to any region of the data storage medium that will be read during initialization of the array of data storage medium, wherein a set of blocks to be written during the writing step is greater than or equal to a maximum read size

FORMATTING A DATA STORAGE MEDIUM TO A DESIRED BLOCK FORMAT

FIELD OF THE INVENTION

The present invention relates generally to an array of data storage media. More particularly, the present invention relates to a method of formatting a data storage medium in an array of data storage media. More particularly, the present invention relates to a method for inclusion of fast formatted media in an array of data storage media.

BACKGROUND OF THE INVENTION

Conventional computer networks typically have at least one common data storage device for central data storage, such as the Hp SureStore Virtual Array 7100 by Hewlett Packard. The SureStore VA 7100 is one exemplary redundant array of independent discs (RAID) that employs a plurality of independent discs (e.g., fiber channel hard drives) in combination for fault tolerance and performance considerations. Conventional RAID arrays and other devices employing an array of data storage media suffer from inconsistent block formatting among the data storage media within the array. It should be appreciated that block formatting as utilized in the present specification refers to formatting the block size and/or block data content of a data storage medium, and can be broadly interpreted to include partitioning and/or data formatting.

Specifically, arrays of data storage media for storing data each have a desired system block format. A specific block format is required to allow an operating system to appropriately define where data files stored on the array of data storage media begin and end. Conventional data storage media, however, are typically manufactured having predetermined block formats that may be different from the desired system block format. For example, standard 18 GB hard drives (part no. ST318451F) manufactured by Seagate come with a standard 512 byte block format. The Hewlett Packard SureStore VA 7100, however, requires a 520 byte block format to provide an eight byte checksum per 512 byes of stored data, which is used for various fault detection and error correction procedures. Thus, 520-byte data storage media have to be specially manufactured for systems with a non-standard block format, which adds to the cost of building the system. A previous solution (Auto Format) for this problem was described in U.S. Pat. No. 6,681,308, titled "Method for Automatically Converting Block Size and Formatting Backend Fibre Channel Disks in an Auto-Inclusive Storage Array Environment."

One option to avoid the lengthy format time associated with Auto Formatting (SCSI format), of a drive, is to use a method known as "fast format," wherein only a format template (in the present embodiment, 512 to 520) for a write block is changed, with minimal or no formatting being performed of the blocks. Specifically, no blocks are reformatted until a "write" operation is to be performed on the given block. When a "write" operation is called, then a 520 format template is used to reformat the particular block. The assumption for making the fast format method viable is that each block will be written to before being read from. One "fast format" method is provided by Seagate drives, which perform minimal drive preparation, by changing only the template for the write block boundaries from 512 to 520, and then returns as if the full format had been completed. Such a fast format operation means that a storage array such as the VA7100/7400/7410/7110 could include and use this disk almost instantly as compared with the introduction of a new 512-byte block drive using a standard format technique, wherein each block is individually formatted prior to use of the storage medium. Unfortunately, this fast formatting has left the disk in a state where the drive reports a 520-byte block format, but all blocks are actually still formatted to 512-byte block size. But, the storage array is not aware of this new expectation and may read from blocks before writing to them. Reading before writing can cause lengthy retries and accumulated errors that can lead to false failure prediction.

Thus, a need exists for a method of integrating fast formatted media into an array of data storage media.

BRIEF DESCRIPTION OF THE DRAWINGS

FIG. 1 is a flow chart for a method of block formatting a data storage medium in or to be added to an array of data storage media according to one embodiment of the invention;

DETAILED DESCRIPTION OF THE INVENTION

Figure 2:
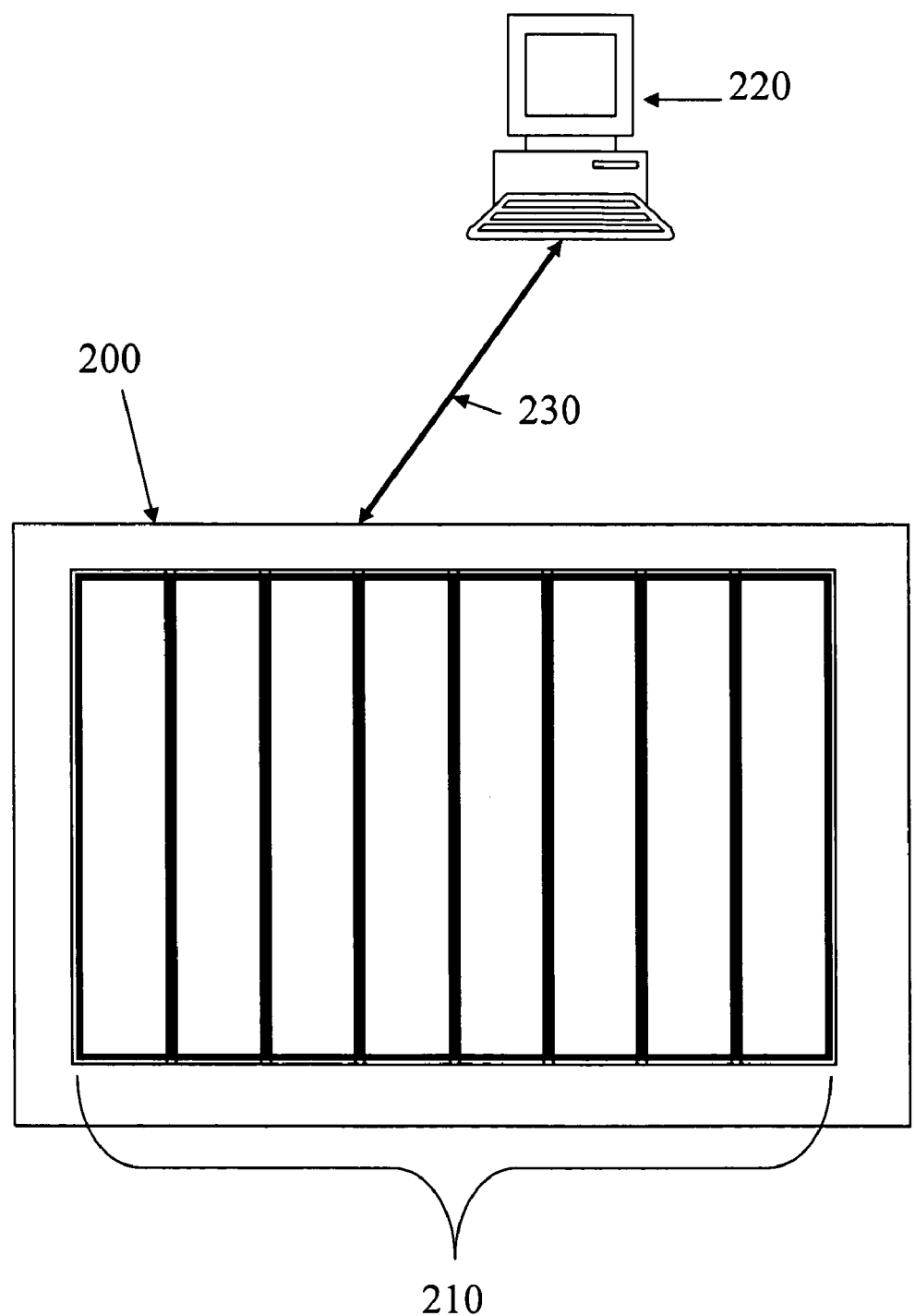
FIG. 2 is a schematic block diagram illustrating blocks of a storage medium in combination with a topology manager.

An exemplary array of data storage media (an "array" hereinafter) 200 according to one aspect of the present invention is depicted in the block diagram of FIG. 2. The array 200 is controlled, in one embodiment by a topology manager 220 that may be part of the array 200 or connected via a link 230 (e.g., a network or other convenient link). The topology manager 220 can initialize the various data storage mediums in the array and can store data on the array 200, and/or generate a block format control signal to initiate block formatting of a data storage medium (a "drive" hereinafter) 210 within the array 200. FIG. 2 shows eight drives 210, by way of example. As would be readily apparent to one skilled in the art, other array configurations may also be implemented. Thus, the array of FIG. 2 is exemplary only, and is not limiting on the scope of the invention.

The term data storage media according to the present invention is intended to be interpreted broadly, including data storage media such as tapes and discs, and other data storage media as would be readily apparent to one skilled in the art, and is thus not intended to be limiting on the scope of the invention. For purposes of explanation only and not limiting on the present invention, embodiments of the present invention will be described below in reference to hard disc drives as are commonly implemented in a RAID array.

Referring to FIG. 1, in block 100 a first step of an embodiment of the method of the invention is to determine if a fast format indicator has been set for the data storage medium. One embodiment of the invention may be implemented to immediately follow an addition and "fast formatting" of a drive. In this embodiment, a fast format indicator such as a fast format bit may be set after the format template has been set. The fast format indicator is used to indicate that only the format template for writing has been set, and that the areas to be read during initialization have not yet been written to.

Referring to block 110, if the fast format indicator is set, then writing initially to any blocks of the data storage medium that will be read during initialization of the array of data storage medium. A region of blocks of the data storage medium that will be read during initialization of the array of storage media could comprise, for example, the drive's membership metadata stamp area. "Initialization" is defined broadly as all operations during power-on or inclusion of a disk into an array. The blocks that are to be read during initialization of the storage medium may be determined empirically or otherwise. For some storage media, only a small portion in a fixed area on the medium will be read. However, other storage media may have a much larger area for a read during initialization. In one embodiment, a topology manager system may be used to determine during spin-up where a metadata stamp is to be written on the data storage medium based on drive size or some other criterion. The method of determining the blocks to be written to during initialization is not limiting on the invention.

After the writing step above has been performed, the fast format indicator may be changed to indicate that the present method has been performed.

After initialization, when writing a chunk of data, the granularity of a write operation of a set of blocks (a chunk) is to be greater than or equal to the size of a maximum read. For example, during a data recovery operation, if data that is to be moved to another disk is read in 8 Meg chunks, then the number of blocks to be written would be the number of blocks sufficient to cover an 8 Meg chunk, even if only a small portion of that 8 Meg chunk would actually be read. Accordingly, if the fast format indicator was set and the step of writing initially to any blocks of the data storage medium that will be read during initialization of the array of data storage medium is performed, then the system subsequently obeys a write-before-read model wherein all writes are done in sizes that are greater than, or equal to a maximum read size. In one embodiment of the present invention, the topology manager 220 of FIG. 2 may be set to perform the steps of blocks 100 and 110. Note the size numbers in the example above are not limiting on the invention.

In one embodiment, an operation may be provided of determining empirically or otherwise if any firmware component that performs data writes and reads (as opposed to initialization writes and reads) does not follow the write-before-read model. Such an operation will prevent reading blocks that have not yet been reformatted to the correct format because they have not been written to. If such firmware is determined, then any regions that would be read by such firmware must be written to, in order to set that region to the proper block format.

In one embodiment, a separate step may be performed to determine a read size for the storage system. The step could be determined empirically or in some other convenient fashion.

Figure 3:
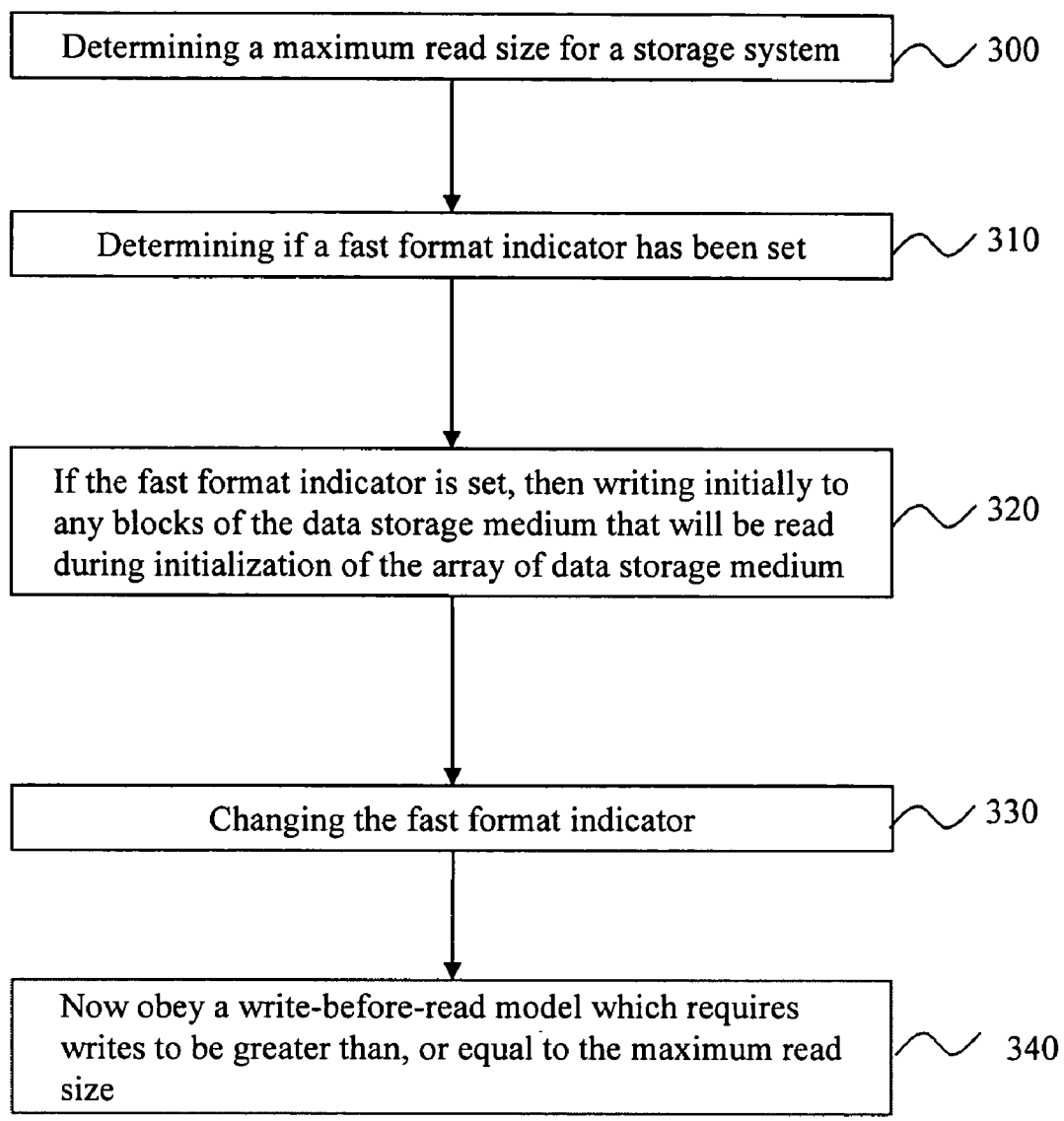
FIG. 3 is a flow chart for a method of block formatting a data storage medium in or to be added to an array of data storage media according to a further embodiment of the invention.

FIG. 3 is a flowchart of a further embodiment of the present invention. Block 300 is a step performed to determine a maximum read size for a storage system. In block 310, an operation is performed to determine if a fast format indicator has been set. In block 320, a step is performed, if the fast format indicator is set, then writing initially to any blocks of the data storage medium that will be read (such as the drive's membership metadata stamp area) during initialization of the array of data storage medium. In block 330, the operation is performed of changing the fast format indicator. In block 340, subsequently obeying a write-before-read model wherein all writes are done in sizes that are greater than, or equal to a maximum read size.

In one embodiment, the array of data storage media may comprise a RAID array of data storage media and the data storage medium may comprise a hard drive. A desired block format may be 520 bytes, and a current block format may be 512 bytes.

Figure 4:
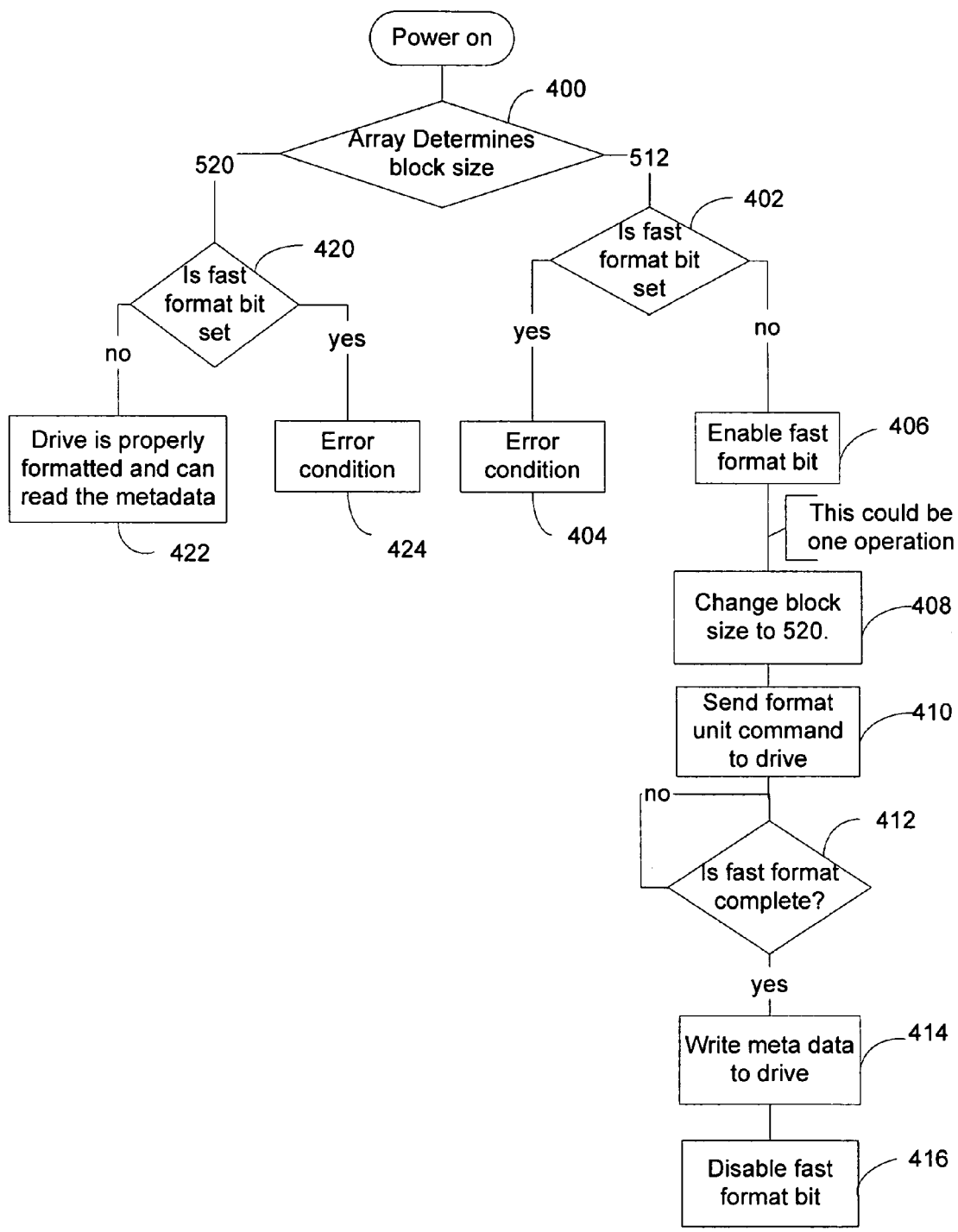
FIG. 4 is a flowchart of an embodiment of the overall operation of the invention.

Referring to FIG. 4, a logic flow for the operation of one embodiment is described. In step 400 it is determined if what is the block size of a drive to be added to the system. Ingf step 402, if the block size is 512, it is determined if the fast format block is set. If it is, then an error condition is set in step 404 because this bit was set, but the format command was not sent or failed. The error condition might report, in one embodiment, that a 0 byte block size to indicate the failed format. If the fast format block is not set, then in step 406 the fast format bit is enabled. In step 408 the block size template is set to 520. In step 410 a format unit command is sent to the drive. In step 412 it is determined if the fast format is complete. If it is, then metadata is written to the drive in areas that will be read first before write. In step 416 the fast format bit is then disabled and the drive is ready for use with 520 byte blocks.

Alternatively, if the array size is determined to be already at 520, then in step 420 it is determined if the fast format bit is set. If so, then an error condition is set in block 424, indicating that the metadata to be read before write was not written to the drive, or indicating that the fast format bit could not be cleared before a reset. If the fast format bit is not set, then in step 422 it is listed that the drive is properly formatted and that metadata can be read and that the drive is ready for use with 520 byte blocks.

An advantage of some of the embodiments of the present invention is time saving. In manufacturing, the present invention may be used to affect the time it takes to prepare a system for shipment. For example, (time to prep a system in mfg with autoformat)−(time to prep system with fast autoformat)=time savings; (time savings)*(operating costs per minute)=total savings.

Alternatively, in the field savings realized in formatting drives can be expressed as follows: (time to autoformat disks)−(time to fast autoformat disks)=time savings; (time savings)*(customer engineer cost per minute)=total savings.

As one example, (73 Gig formats in 40 mins)−(73 Gig fast formats in 3 mins)=~37 mins; (37 mins)*($300/60 min)=$185 total savings per visit/installation. In some embodiments it has been found that the amount of time required to format the disks scales linearly with capacity. In the future, as drive capacities grow (for example doubling disk capacity to 146 GB now takes 80 minutes to slow format and 6 minutes to fast format.), the amount of savings generated by some embodiments of the present invention may scale linearly (from $185 to $370 per visit). Over the lifetime of a product, with field replacements of disks and new disks being added, this per visit cost can have a major impact on total Warranty Costs.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen in generally on designer choice. It is understood that all such variations are within the scope of the invention. Likewise, software and web implementation of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method of block formatting a data storage medium in or to be added to an array of data storage media to a desired block format comprising:
   determining if a fast format indicator has been set for the data storage medium; and
   if the fast format indicator is set, then writing initially to any blocks of the data storage medium that will be read during initialization of the array of data storage media.

2. The method as defined in claim 1, wherein if the fast format indicator is set and the step of writing initially to any blocks of the data storage medium that will be read during initialization of the array of data storage media is performed, then subsequently obeying a write-before-read model wherein all writes are done in sizes that are greater than, or equal to a maximum read size.

3. The method as defined in claim 1, further comprising;
   after the writing step has been performed, changing the fast format indicator.

4. The method as defined in claim 1, further comprising determining a maximum read size for the data storage medium.

5. The method as defined in claim 1, wherein said array of data storage media comprises a RAID array of data storage media.

6. The method as defined in claim 1, wherein said data storage medium comprises a hard drive.

7. The method as defined in claim 1, wherein said desired block format is 520 bytes.

8. The method as defined in claim 1, wherein said current block format is 512 bytes.

9. An array of data storage media having automatic data storage medium block formatting capability, comprising:
   a plurality of data storage media; and
   a topology manager system for determining if a fast format indicator has been set for the data storage medium and if the fast format indicator is set, then performing initialization of said plurality of data storage media, said topology manager system writing initially to any blocks of the data storage media that will be read during initialization of the of the array of data storage media.

10. The array as defined in claim 9, wherein if the fast format indicator is set and the topology manager writes initially to any blocks of the data storage medium that will be read during initialization of the array of data storage medium is performed, then the topology manager subsequently obeying a write-before-read model wherein all writes are done in sizes that are greater than, or equal to a maximum read size.

11. The array as defined in claim 9, wherein the topology manager, after the writing step has been performed, changes the fast format indicator.

12. The array as defined in claim 9, wherein said plurality of data storage media comprises a RAID array of data storage media.

13. A program product for block formatting a data storage medium in or to be added to an array of data storage media to a desired block format, comprising machine-readable program code for causing, when executed, a machine to perform the following method:
   determining if a fast format indicator has been set for the data storage medium; and
   if the fast format indicator is set, then writing initially to any blocks of the data storage medium that will be read during initialization of the array of data storage media.

14. The program product as defined in claim 13, wherein if the fast format indicator is set and the step of writing initially to any blocks of the data storage medium that will be read during initialization of the array of data storage medium is performed, then subsequently obeying a write-before-read model wherein all writes are done in sizes that are greater than, or equal to a maximum read size.

15. The program product as defined in claim 13, further comprising program code for:
   after the writing step has been performed, changing the fast format indicator.

16. The program product defined in claim 13, further comprising program code for;
   determining a read size for the data storage medium.

17. A system for block formatting a data storage medium in or to be added to an array of data storage media to a desired block format comprising:
   means for determining if a fast format indicator has been set for the data storage medium; and
   if the fast format indicator is set, then writing initially to any blocks of the data storage medium that will be read during initialization of the array of data storage media.

18. An array of data storage media having automatic data storage medium block formatting capability, comprising:
   a plurality of data storage media;
   means for determining if a fast format indicator has been set for each of a plurality of the data storage media; and
   means for, if the fast format indicator is set, writing initially to any blocks of the data storage medium that will be read during initialization of the array of data storage media.

* * * * *

UNITED STATES PATENT AND TRADEMARK OFFICE
CERTIFICATE OF CORRECTION

PATENT NO. : 7,181,586 B2
APPLICATION NO. : 10/816897
DATED : February 20, 2007
INVENTOR(S) : Dallmann et al.

It is certified that error appears in the above-identified patent and that said Letters Patent is hereby corrected as shown below:

In column 4, line 43, delete "=~37 mins" and insert -- ~=37 mins --, therefor.

In column 5, line 34, in Claim 3, after "comprising" delete ";" and insert -- : --, therefor.

In column 5, line 37, in Claim 4, after "comprising" insert -- : --.

In column 5, line 58, in Claim 9, after "initialization of the" delete "of the".

In column 6, line 38, in Claim 16, after "code for" delete ";" and insert -- : --, therefor.

Signed and Sealed this

Ninth Day of June, 2009

JOHN DOLL
*Acting Director of the United States Patent and Trademark Office*